United States Patent Office 3,236,918
Patented Feb. 22, 1966

3,236,918
PROCESS FOR IMPROVING DYEABILITY OF POLY-OLEFINIC MATERIALS BY ADDING POLYTRI-AZOLES
Yoshio Tsunoda, Tokyo, Toru Taneda, Ibaragi-shi, Osaka, and Kiyoshi Akamatsu, Toyonaka-shi, Osaka, Japan, assignors to Asahi Kasei Kogyo Kabushiki Kaisha, Osaka, Japan, a corporation of Japan
No Drawing. Filed May 10, 1961, Ser. No. 109,004
Claims priority, application Japan, May 20, 1960, 35/24,753; Dec. 23, 1960, 35/49,774, 35/49,775
4 Claims. (Cl. 260—897)

This invention relates to an improved process for imparting good dyeability to shaped articles of polyolefinic materials.

The shaped articles of polyolefinic materials, e.g. polyethylene, polypropylene, polybutene, etc. have many excellent qualities, but they are so poorly dyeable that it is impossible to effect dyeing of them by the ordinary dyeing process. Therefore, the polyolefinic materials must be colored by the incorporation of a dye or pigment thereinto before they have been subjected to shaping, or they must be colored by a specific dyeing process, e.g. high pressure dyeing, carrier dyeing, etc.

These dyeing processes, however, are somewhat limited to satisfy the commercial desire for a variety of colors, and furthermore the specific dyeing processes are costly. In order to solve the above problem, various attempts have been made heretofore, in which epoxy resin, polyvinyl resin, etc. are incorporated into a polyolefinic material prior to its shaping, to improve the dyeability of said material. But, many of these attempts are accompanied by the change of thermal characteristics of said material, with the result that undesirable phenomena, e.g. decreased processabiliy, discoloration of a shaped article, obtained, or degraded physical properties, would occur. In some cases, the additive substance is leaked causing damage to the polyolefinic material after it has been shaped, or the added substance is leaked into a dyeing bath making the bath unstable during the dyeing. Loss of effective dyes also is inavoidable.

The present invention resides in a process of imparting excellent dyeability to olefinic materials, without accompanying disadvantages or failures. In accordance with the present invention, the dyeability of polyolefin materials is improved by adding to the polyolefin materials at least one member selected from the materials of the polytriazole series.

The term "materials of the polytriazole series" as used herein refers to condensation polymerization products having triazole ring, triazoline ring or triazolidine ring and represented by the general formula

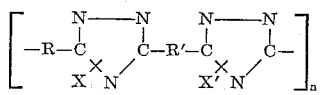

In the above-indicated general formula, R and R', which may be same or different, mean
(1) methylene radical and the monomer or polymer derived therefrom;
(2) cycloalkane and the derivative thereof;
(3) benzene nucleus and the derivative thereof;
(4) heterocyclic compound; and
(5) the condensation product in which any of the above-indicated members is condensed by sulfonic, ether, ketonic, amide, imino or sulfamide group,
and X and X', which may be same or different, mean
(1) hydrogen,
(2) alkyl radical and the derivative thereof,
(3) benzene nucleus and the derivative thereof,
(4) fused benzene nucleus and the derivative thereof, and
(5) amino group and the derivative thereof.

Typical examples of the condensation polymerization products as used in the present invention will be detailed as follows:
(1) the dyeability of polyolefin materials is improved,
(2) The condensation polymers having two formulas as described hereinunder which are produced by homopolymerizing an acid dihydrazide, e.g., adipic acid dihydrazide or sebacic acid dihydrazide or two kinds of hydrazides, e.g., adipic acid dihydrazide and sebacic acid dihydrazide

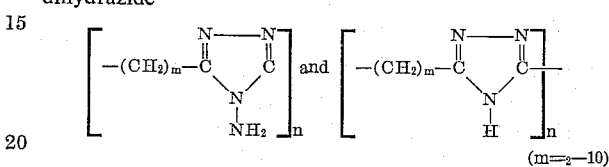

(m=2—10)

wherein substituted $NH_2$ may be introduced to the triazole ring depending on the conditions or procedures employed for preparation.

A condensation polymer having the formula

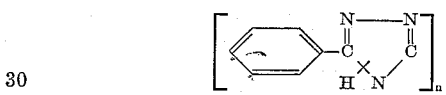

which is produced by polymerizing, for example, terephthalic acid dihydrazide.

(3) The alkyl (e.g. methyl)-substituted condensation polymer of terephthalic acid dihydrazide wherein R is taken as benzene nucleus and X is alkyl radical and which is prepared by the reaction of sodium alcoholate and alkyl iodide with the condensation polymer of terephthalic acid dihydrazide as referred in Par. 2:

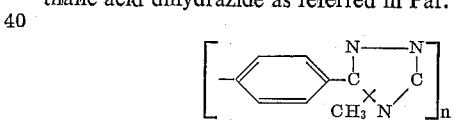

(4) Such material as obtained by the reaction of the condensation polymer of adipic or sebacic acid dihydrazide with benzaldehyde, wherein R is designated as methylene radical and X as amino-derived group:

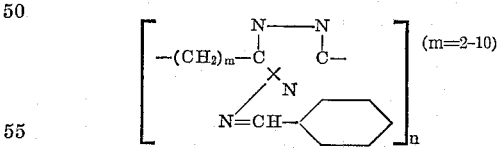

(5) The condensation polymer of 1,4-cyclohexyl dicarboxylic acid dihydrazide, wherein R is designated as cycloalkane and its derivative.
(6) The condensation polymer of naphthaline-1,4-dicarboxylic acid dihydrazide wherein R is fused benzene nucleus or its derivative.
(7) The condensation polymer of isocincomeronic acid dihydrazide wherein R is heterocyclic group.
(8) The condensation polymer of hydrazide of 4,4-thio-dialkylene dibenzoic acid.

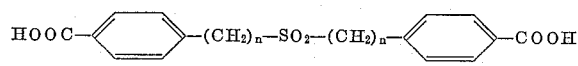

With respect to the radical X, which is a substituent at the hydrogen of the cyclic portion of a condensation polymer, a great number of examples may be referred, including

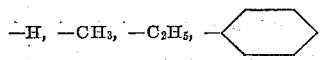

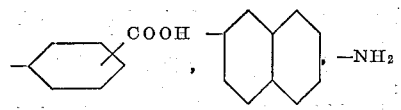

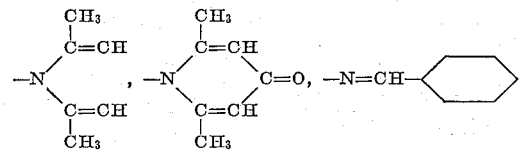

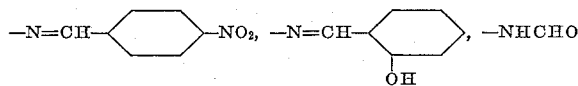

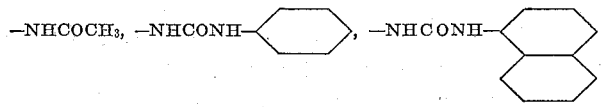

and 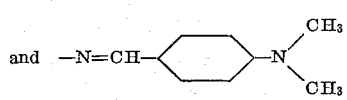

These substituents where they are present in the chain of the condensation polymer may be same or different.

The above-indicated materials which can be used as additive in the present invention should have a melting point within the approximate range of from 100° to 300° C. and preferably approximately 200° C. and these materials should be present in amount of from 1% to 20%, depending on the processability or other characteristics.

In order for addition such additive materials to polyolefinic material, various methods can be employed, e.g. direct addition of the additive materials to the polyolefinic resin, incorporation of the additive materials into the polyolefinic resin by means of heating roller, extruder, etc., and the addition of the additive materials in the form of a solution in a solvent or a hot solution in fluid paraffine, polyethylene glycol, etc.

The polyolefinic resin having been added with the polymeric additive material can be as easily shaped or processed as ordinary polyolefinic resin, without suffering from discoloration or degradation and decrease in processability. The articles so obtained are ready for dyeing with dispersion dye or acidic dye, without using specific dyeing process.

The following examples will serve to show the present invention in details.

*Example 1.*—An equal mixture of adipic acid hydrazide and hydrazine hydrate is subjected to condensation polymerization reaction in the stream of nitrogen to form the copolymeric condensation product of polytetramethylene-aminotriazole and polytetramethylene-triazole (M.P. 200° C.). This product is added in amount of 5% by weight with polyethylene resin pellet having an average molecular weight of 150,000. The mixture is sufficiently mixed by means of a pelletizer and then formed to yarn comprising monofilaments of 10 deniers by means of an extruder heated at 240° C. The yarn is dyed to fine yellow color with 5% Benzyl Yellow GW (Color Index Acid Yellow 78) at a bath ratio of fifty times and at a temperature of 100° C. under acetic acid-acidic condition. The dyed material can pass JIS 3rd Class in fastness and it is satisfactory.

*Example 2.*—Adipic acid hydrazide is mixed with hydrazine hydrate at the weight ratio of 5:1, and the resulting mixture is subjected to condensation polymerization reaction in the nitrogen stream to form polytetramethylene triazole (M.P. 230° C.). This product is added in amount of 6% by weight with polybutene 1 resin powder having an average molecular weight of 180,000 and the mixture is extruded by means of an extruder heated at 260° C. to have yarn comprising monofilaments of 10 deniers. This yarn can be dyed to fine orange color with 5% Celliton Fast Orange 5R

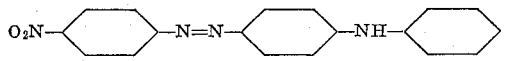

(Color Index Disperse Orange 1.11080) at a bath ratio of 30 times at 100° C. The dyed material can pass JIS 3rd Class in fastness and it is satisfactory.

*Example 3.*—A mixture of sebacic acid hydrazide and hydrazine hydrate at the weight ratio of 5:1 is subjected to reaction under ordinary pressure in nitrogen atmosphere to have the corresponding condensation polymerization product which is found on chemical analysis to contain 20% of nitrogen and which is identified as polyoctamethylene triazole by infra-red absorption spectrum. This product is added in amount of 5% by weight with powdered polypropylene resin having an average molecular weight of 50,000, and the resulting mixture is subjected to melt spinning by an extruder at 250° C. to have yarn comprising monofilaments of 6 deniers. The yarn is dyed to brilliant red color with 5% Celliton Scarlet B

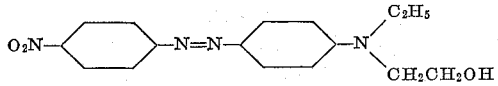

(Color Index Disperse Red 1.11110) at a bath ratio of 50 times and at a temperature of 100° C. The dyed material can pass JIS 3rd Class in its resistance against both of abrasion and laundry (corresponding to 4 to 8 classes in A.A.T.C.C. Standard Test methods 8, +19·57 and 36, 1957 Text II, respectively; the same shall apply hereinafter), and it is of the high practical value.

*Example 4.*—The yarn, prepared in the same manner as in Example 3, is dyed to brilliant red color with 3% Rose Bengal

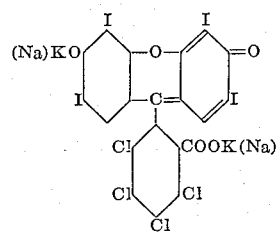

(Color Index Acid Red 94.45440) at a bath ratio of 50 times and at a temperature of 100° C. under acetic acid-acidic condition. The dyed article can pass JIS 3rd Class in its resistance against both of abrasion and laundry.

*Example 5.*—To low pressure polyethylene pellet having an average molecular weight of 150,000, 5% of polytetramethylene N-benzalaminotriazole obtained by treating adipic acid hydrazide-condensation polymer with benzaldehyde is added. The mixture is passed into a pelletizer at 250° C. to have pellet which is then melt-spun by means of an extruder at 240° C. to produce yarn comprising monofilaments of 10 deniers. The produced yarn can be dyed to deep blue color by using Dispersol Fast Yellow G, 3% (Color Index Dispersol Yellow 3.11855), at a bath ratio of 50 times and at a temperature of 100° C. The dyed material has good resistance against both of abrasion and laundry as higher as passable JIS Standards 3rd Class.

*Example 6.*—The same yarn as in Example 5 can be dyed to beautiful blue color by using 5% Benzyl Blue RBF

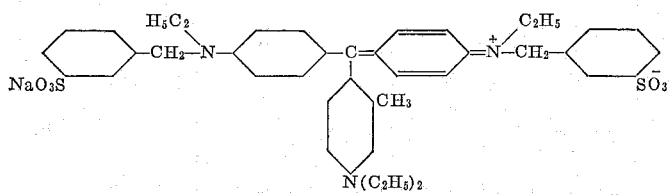

(Color Index Acid Blue 15.42645) at a bath ratio of 50 times at 100 °C. The dyed material has resistance against abrasion and laundry as corresponding to 3rd Class of JIS Standards.

*Example 7.*—3% of polyphenylene methyl triazole, obtained by reacting terephthalic acid dihydrazide-condensed polymer with sodium methylene and methyl iodide, is added to polypropylene resin pellet having an average molecular weight of 100,000 and the resulting mixture is passed through a pelletizer to have a mixed pellet, which is then extruded by means of an extruder at 240° C. to have yarn comprising monofilaments of 5 deniers. The yarn is dyed to deep orange color by using 3% Easton Orange 2R at a bath ratio of 50 times and at a temperature of 100° C. The dyed material can pass JIS Standards 3rd Class in resistance against both of abrasion and laundry.

*Example 8.*—The low pressure polyethylene resin having a molecular weight of 150,000, 5% of nitrous acid-treated 1,4-cyclohexyl dicarboxylic acid dihydrazide condensation polymer in which amino group of the aminotriazole portion of said polymer has been converted into hydrogen is added. The mixture is melt-spun to have yarn of 10 denier monofilaments. The yarn is dyed to fresh yellow-orange color by using 5% Celliton Fast Yellow 5R

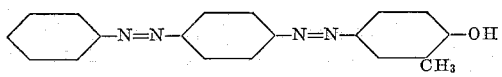

(Color Index Disperse Yellow 7.26090) at a bath ratio of 50 times and at a temperature of 100° C. The dyed material is 3rd Class as measured by JIS method with respect to resistance against abrasion and laundry.

*Example 9.*—To low pressure polyethylene pellet having an average molecular weight of 100,000, 5% of the reaction product from adipic acid hydrazide condensation polymer, sodium methylate and methyl iodide is added. By means of a pelletizer, the additive-mixed pellet is formed and then 10 denier yarn is obtained therefrom by melt spinning process. The yarn is dyed to fresh orange-yellow color by using Celliton (Color Index Disperse Yellow 7.26090), 5%, and a non-ionic surface active agent at a bath ratio of 50 times and at a temperature of 100° C. for one hour. The dyed material can pass JIS Standards 3rd Class in fastness.

*Example 10.*—To polypropylene resin pellet having an average molecular weight of 150,000, 2% of polytetramethylene naphthyl triazole is added, and then from the mixture, 10 denier polypropylene fiber is prepared. Dyeing is carried out by the use of Celliton Fast Yellow 5R (Color Index Disperse Yellow 7.26090) 6% at a bath ratio of 50 times at 100 °C., thereby the fiber being dye to deep orange-yellow color. The fastness of the dyed fiber is 3rd Class as rated by JIS Standards.

*Example 11.*—To polyethylene resin powder having an average molecular weight of 150,000, 3% of polyoctamethylene aminotriazole and 2% of polytetramethylene benzalamino triazole are added. By means of an extruder, the resulted intimate mixture is formed to fiber comprising monofilaments of 15 deniers. The fiber is dyed to purple color by using 5% Benzyl Violet 3B (Color Index Acid Violet 17.426500) at a bath ratio of 50 times at 100° C. The dyed material can pass JIS Standards 3rd Class with respect to fastness.

*Example 12.*—The same fiber as in Example 11 is dyed to deep yellow color by using 3% Dispersol Fast Yellow G

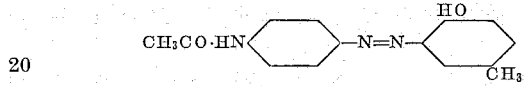

(Color Dispersol Index Yellow 3.11855) at a bath ratio of 50 times at 100° C. The dyed material can pass JIS Standards 3rd Class.

*Example 13.*—To polypropylene resin powder having an average molecular weight of 200,000, 5% of polytetramethyleneformaminotriazole is added to have an intimate mixture. Using an extruder, yarn comprising monofilaments of 6 deniers is obtained from the mixture. The yarn is dyed to beautiful green color by using 5% Cibacet Dark Green B (disperse dye mixture) at a bath ratio of 50 times at 100° C. The fastness of the dyed material is 3rd Class as measured by JIS method.

*Example 14.*—To polypropylene resin powder having an average molecular weight of 180,000, 3% of polyphenylene acetamino triazole is added with sufficiently mixing. Using an extruder, fiber of 10 denier monofilaments is prepared from the mixture. The fiber is dyed to beautiful red color by using 5% Rose Bengal (Color Index Acid Red 94.45440) at a bath ratio of 50 times at 100° C.

*Example 15.*—To polypropylene resin pellet having an average molecular weight of 100,000, 3% of polycyclohexylene triazole prepared by the condensation polymerization of 1,4-cyclohexyldicarboxylic acid dihydrazide is mixed. In the similar manner as in Example 14, 10d polypropylene fiber is prepared, and it is dyed with Celanthrene Violet BGF (Color Index Disperse Blue 8), 5%, to have a beautiful purple-colored dyed material which exhibits resistance against abrasion and laundry as higher as 3rd Class measured by JIS method.

*Example 16.*—A 5:1 (by weight) mixture of sebacic acid dihydrazide and hydrazine hydrate is subjected to polycondensation reaction at 220°–260° C. in the nitrogen atmosphere to have a polycondensate melting at 210° C. The product is found to contain 27% nitrogen on chemical analysis and it is identified as polyaminotriazole-polytriazole copolymeric condensation product. It is added in amount of 5% to powdered Polybutene 1 resin having an average molecular weight of 80,000. The mixture is melt-spun by using an extruder heated at 260° C. to have yarn of 5 denier monofilaments. This yarn is dyed with 5% Benzyl Blue (Color Index Acid Blue 15.42645) at a bath ratio of 50 times at 100° C. under acetic acid-acidic condition. The beautiful blue yarn so obtained can pass JIS Standards 3rd Class.

*Example 17.*—The yarn, similarly prepared as in Example 16, is dyed with Celliton Scarlet B (Color Index Disperse Red 1.11110), 5%, at a bath ratio of 50 times at 100° C. The deep red colored yarn so obtained can pass JIS Standards 3rd Class with respect to fastness.

*Example 18.*—Terephthalic acid dihydrazide, together with an excess amount of hydrazine hydrate, is condensation-polymerized to form polyamino triazole, which is then reacted with sodium methylate and methyl iodide to partially substitute the amino group with methyl group. The resultant product contains 33% of nitrogen and this may suppose that about a half of the total amino groups in the polyamino triazole is substituted with methyl group. The product is added 5% by weight to powdered polypropylene resin having an average molecular weight of 150,000 and the mixture is melt-spun by means of an extruder at 240° C. to have yarn of 10 denier monofilaments having a tenacity of 4 g./denier. The yarn is dyed to yellow color by using 3% Dispersol Fast Yellow (Color Index Dispersol Yellow 3.11855) at a bath ratio of 50 times at 100° C. The fastness of the dyed fiber against abrasion and laundry is rated as 3rd Class of JIS Standards.

*Example 19.*—The yarn, prepared in the same manner as in Example 18, is dyed to deep red color by using 3% Rose Bengal (Color Index Acid Red 94.45440) at a bath ratio of 50 times at 100° C. under acetic acid-acidic conditions. The fastness of the dyed yarn against both abrasion and laundry is rated as 3rd Class of JIS Standards.

*Example 20.*—The condensation polymerization product, obtained by the reaction of adipic acid dihydrazide with excessive hydrazine hydrate, is reacted with benzaldehyde to form tetramethyleneaminotriazole-tetramethylene benzalamino triazole copolymeric condensation product. This product, 5% by weight, is added to polyethylene resin pellet having an average molecular weight of 150,000. Using a pelletizer, the mixture is formed into pellet, and then melt-spun to have yarn of 10 denier monofilaments. This yarn is dyed to beautiful color with 5% Benzyl Violet (Color Index Acid Violet 17.42650) at a bath ratio of 50 times at 100° C. under acetic acid-acidic condition. The fastness of the dyed material against abrasion or laundry is rated as 3rd Class of JIS Standards.

*Example 21.*—The yarn, prepared in the similar manner as in Example 20, is dyed to deep yellow-orange color by using 3% Celliton Fast Yellow 5R (Color Index Disperse Yellow 7.26090) at a bath ratio of 50 times at 100° C. The fastness of the dyed material is rated as 3rd Class of JIS Standards.

*Example 22.*—To polypropylene resin pellet having an average molecular weight of 150,000, isocinomeronic acid dihydrazide-condensed polymer, 5% by weight, is added. From the resulting mixture, polypropylene fiber is prepared in the similar manner as in Example 18, and it is dyed to beautiful orange-yellow color by using 5% Celliton Fast Yellow 5R (Color Index Disperse Orange 1.11080) at a bath ratio of 20 times at 100° C. The fastness of the dyed fiber is rated as 3rd Class of JIS Standards.

*Example 23.*—To polyethylene resin powder having an average molecular weight of 100,000, 4,4'-(thiodiethylene)-di-benzoic acid dihydrazide condensed polymer, 1% by weight, is added. The mixture is formed to yarn of 10 denier monofilaments. This yarn is dyed to purple color by using 5% Cellanthrene (Color Index Disperse Blue 8) at a bath ratio of 50 times at 100° C. The dyed material can pass JIS Standards 3rd Class with respect to fastness against abrasion, sunlight and laundry.

*Example 24.*—To polypropylene resin powder having an average molecular weight of about 100,000, powdered sebacic acid hydrazide condensation polymerization product, M.P. 220° C., is added 20% by weight, after sufficiently mixing the powdered materials, the resulting mixture is extruded through small holes with 0.5 mm. in diameter by means of an extruder at 240° C. The extruded mass is stretched four times its original length to have yarn of 8 denier monofilaments. During preparation, the yarn is entirely safe from cutting, staining or other undesired phenomenon and it is colorless and transparent. It also retains strength of 6 gr./denier and elongation of 25%. The yarn is dyed with 3% Rose Bengal (Color Index Red Acid 94. 45440) at a bath ratio of 50 times at 100° C. for one hour under acetic acid-acidic condition. The dyed material has brilliant red color and it can pass JIS Standards 3rd Class with respect to its fastness against abrasion and laundry.

*Example 25.*—The yarn, prepared in the same manner as in Example 24, is dyed with 5% Benzyl Violet 3B (Color Index Acid Violet 17. 42650) at a bath ratio of 50 times at 100° C. under acetic acid-acidic condition for one hour. The dyed material has brilliant purple color and it can pass JIS Standards 3rd Class with respect to fastness against abrasion and laundry.

*Example 26.*—To low pressure polyethylene pellet having an average molecular weight of about 150,000, powdered adipic acid hydrazide condensation polymer (M.P. 190° C.), 5% by weight, is mixed. The resulting mixture is formed to pellet of 2 mm. square by means of an extruder at 220° C. and then extruded through small holes of 0.5 mm. in diameter by means of another extruder at 210° C. The extruded mass is stretched four times its original length. Extrusion and stretching of the resinous mixture proceed smoothly, and colorless transparent fiber of 10 denier monofilaments is obtained. It has strength of 4 gr./denier and elongation of 20%. The so obtained yarn is dyed with 5% Benzyl Yellow GW (Color Index Acid Yellow 78) at a bath ratio of 50 times at 100° C. for one hour under acetic acid-acidic condition. The dyed material has beautiful yellow color and its fastness against abrasion and laundry corresponds to 3rd Class of JIS Standards.

*Example 27.*—The yarn of Example 26 is dyed with 5% Celanthrene Violet BGF (Color Index Disperse Blue 8), together with a non-ionic surface active agent as dispersion agent, at a bath ratio of 50 times at 100° C. for one hour. The dyed material has beautiful purple color and its fastness against abrasion and laundry corresponds to 3rd Class of JIS Standards.

*Example 28.*—To polypropylene resin pellet (M.W. 150,000), a mixed condensation polymerization product (M.P. 210° C.) of adipic acid hydrazide and sebacic acid hydrazide, 3% by weight, is mixed. The resulting mixture is formed to pellet of 2 mm. square by means of an extruder at 230° C. and then extruded through small holes of 0.5 mm. in diameter by means of a different extruder at 240° C. The extruded mass is stretched four times its original length to have yarn of 1.5 denier monofilaments, during the preparation, the yarn is entirely safe from cutting or staining, and it is colorless, transparent and has strength of 5 g./denier and elongation of 30%. This yarn is dyed with 5% Benzyl Blue RBF (Color Index Acid Blue 15. 42645) at a bath ratio of 50 times at 100° C. for one hour under acetic acid-acidic condition. The dyed material has fresh blue color and its fastness against abrasion and laundry corresponds to 3rd Class of JIS Standards.

*Example 29.*—To polypropylene resin pellet (M.W. 150,000), 5% 1,4-cyclohexyl dicarboxylic acid dihydrazide condensation polymer is mixed. The resulting mixture is worked up in the same manner as in Example 28. The thus obtained polypropylene fiber is dyed by using a mixed dye containing 0.5% Benzyl Blue RBF (Color Index Acid Blue 15. 42645) and 4% Benzyl Fast Yellow G.W. (Color Index Acid Yellow 78) at a bath ratio of 50 times at 100° C. for one hour. The dyed material has light yellowish green color and its fastness against abrasion and laundry corresponds to 3rd Class of JIS Standards.

*Example 30.*—To polypropylene resin powder (M.W. 100,000), powdered naphthalene-1,4-dicarboxylic acid dihydrazide condensation polymer, 5% by weight, is mixed. The resulting mixture is worked up at 240° C. by means of an extruder in the similar manner as in Example 29, thereby polypropylene fiber of 5 deniers being obtained. This fiber is processed by crimping and cut to 3 inches in length. The thus obtained staple fiber and wool at the ratio of 1:1 are mixed-spun to have yarn. It is dyed with 6% Benzyl Blue (Color Index Acid Blue 15. 42645) in the presence of sodium sulfate and acetic acid at a bath ratio of 50 times at 100° C. for one hour. The dyed fiber is non-speckled and prussian blue in color. The fastness of the dyed material against abrasion and laundry is rated as 3rd Class as measured by JIS method.

What we claim is:

1. A process for improving dyeability of polyolefinic material selected from the group consisting of polyethylene, polypropylene and polybutene-1, which comprises adding to the polyolefinic material 1–20% by weight based on the material of at least one condensation polymer having a melting point of 100° C.–300° C. and consisting of recurrent units represented by the general formula:

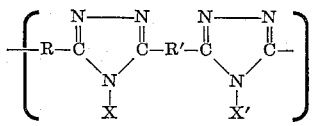

wherein R and R' are respectively a member selected from the group consisting of $(CH_2)_m$—, phenylene, naphthalene, cyclohexylene and pyridylene groups and a group obtained by connecting two —$(CH_2)_m$— groups through a sulfonic group; said m being 2–10; and X and X' are respectively a member selected from the group consisting of hydrogen, methyl, ethyl, phenyl, naphthyl, amino, benzalamino, formalamino, acetamino, carbamylamino, pyrrolyl and pyridyl groups, and wherein X and X' are not both amino groups in the same recurrent unit.

2. A process according to claim 1 wherein the condensation polymer is copolymer of tetramethylene aminotriazole and tetramethylene triazole.

3. A process according to claim 1 wherein the condensation polymer is copolymer of octamethyleneaminotriazole and octamethylenetriazole.

4. A process according to claim 1 wherein the condensation polymer is polytetramethylenetriazole.

References Cited by the Examiner

UNITED STATES PATENTS

| | | | |
|---|---|---|---|
| 2,512,629 | 6/1950 | Fisher et al. | 260—78.4 |
| 3,107,228 | 10/1963 | Cappuccio et al. | 260—837 |
| 3,115,478 | 12/1963 | Natta et al. | 260—897 |

MURRAY TILLMAN, *Primary Examiner.*

WILLIAM H. SHORT, LEON J. BERCOVITZ,
*Examiners.*

J. W. SANNER, G. F. LESMES, *Assistant Examiners.*